(12) United States Patent
Fukumoto et al.

(10) Patent No.: US 7,347,025 B2
(45) Date of Patent: Mar. 25, 2008

(54) SLIDE DOOR OPENING AND CLOSING DEVICE FOR VEHICLES

(75) Inventors: Ryoichi Fukumoto, Nagoya (JP); Tetsuya Ikeda, Kariya (JP); Seiichi Suzuki, Aichi-ken (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 266 days.

(21) Appl. No.: 10/780,675

(22) Filed: Feb. 19, 2004

(65) Prior Publication Data
US 2004/0221510 A1 Nov. 11, 2004

(30) Foreign Application Priority Data
Feb. 27, 2003 (JP) ............................. 2003-051231

(51) Int. Cl.
*E05F 11/00* (2006.01)
(52) U.S. Cl. ..................................... 49/360; 296/155
(58) Field of Classification Search ................. 49/360, 49/352; 296/146.4, 155
See application file for complete search history.

(56) References Cited

U.S. PATENT DOCUMENTS

| | | | | |
|---|---|---|---|---|
| 5,025,591 A | * | 6/1991 | DeLand et al. | 49/360 |
| 5,323,570 A | * | 6/1994 | Kuhlman et al. | 49/360 |
| 5,389,920 A | | 2/1995 | DeLand et al. | |
| 5,505,022 A | * | 4/1996 | Shibata et al. | 49/352 |
| 5,740,630 A | * | 4/1998 | Medebach | 49/352 |
| 5,806,246 A | | 9/1998 | Azuma | |
| 5,813,282 A | * | 9/1998 | Azuma | 74/89.22 |
| 5,884,433 A | | 3/1999 | Watanabe et al. | |
| 6,539,670 B2 | * | 4/2003 | Haag et al. | 49/141 |
| 6,553,719 B1 | * | 4/2003 | Stone et al. | 49/358 |
| 7,159,930 B2 | * | 1/2007 | Yokomori et al. | 296/155 |

FOREIGN PATENT DOCUMENTS

| | | |
|---|---|---|
| JP | HEI. 59-170381 A | 9/1984 |
| JP | HEI. 8-232539 A | 9/1996 |
| JP | 9-25765 A | 1/1997 |
| JP | 9-72158 A | 3/1997 |
| JP | HEI. 10-8828 A | 1/1998 |
| JP | 10-205214 | 8/1998 |
| JP | 2001-342774 A | 12/2001 |

OTHER PUBLICATIONS

European Patent Office Search Report.

* cited by examiner

*Primary Examiner*—Jerry Redman
(74) *Attorney, Agent, or Firm*—Buchanan Ingersoll & Rooney PC

(57) ABSTRACT

A slide door opening and closing device for vehicles including a wire winding pulley provided at a step panel positioned at under part of a vehicle and driven by a motor, a driven pulley, a lower roller supporting member, and a wire wound on said each pulley wherein the wire includes two wires, one end of each wire is fixed to wire winding pulley having a rotation axis in approximately horizontal direction, and the other end of each wire is attached to the lower roller supporting member through a spring.

19 Claims, 7 Drawing Sheets

SLIDE DOOR OPENING AND CLOSING DEVICE FOR VEHICLES

CROSS REFERENCE TO RELATED APPLICATIONS

This application is based on and claims priority under 35 U.S.C. §119 with respect to a Japanese Patent Application 2003-051231, filed on Feb. 27, 2003, the entire content of which is incorporated herein by reference.

FIELD OF THE INVENTION

The present invention generally relates to a vehicle slide door opening/closing device.

BACKGROUND OF THE INVENTION

For a common slide door opening and closing device, an upper rail, a lower rail and a center rail are attached to an upper part, a lower part and a rear-center part of an entrance opening at a vehicle side face, respectively. To make a slide door opening and closing operation, rollers, rotatabily supported to brackets fixed to the slide door, are slid along each rail.

In an automatic opening and closing device for a vehicle slide door, a belt driving system, a wire driving system, a cable driving system or others is commonly applied with being assembled on vehicle step panel which is used as an entrance step for getting on or off of passenger.

An example of a belt driving system has been disclosed in a Japanese Patent Laid-Open Publication published as No. Hei. 10(1998)-8828. In the disclosed belt driving system, a motor, a driving pulley driven by the motor, a driven pulley (provided at both fore side and rear side of a step panel), and an idle pulley are displaced on the under surface of the step panel and assembled as a belt driving system module. The step panel is attached on the vehicle body with a space under it for accommodating the belt driving system mechanism therebetween. A loop-like timing belt extends fore and aft and is wound on each pulley, and a part of a slide door is fixed to the timing belt through a bracket. Then, the slide door can move to open or close.

In this system, an output rotation axis of a drive motor points to vertical direction because of the relationship between the driving pulley and the timing belt. In this configuration, projected area on a horizontal plane of the drive motor is wider than projected area on a vertical plane, because the drive motor usually is attached with drive mechanisms including such as a magnetic clutch. In actual design, a part of the step panel has to be deformed to inflate upward to ensure the height space for accommodating the drive motor. Therefore, the wider the infrared area of the step panel for the space to the drive motor becomes, the narrower the entrance step area for the passenger is. Therefore, design flexibility of the step panel is restricted, and ease in getting on and off becomes worse.

For a wire or a cable driving system, Japanese Patent Laid-Open Publications published as Nos. Hei. 8(1996)-232539 and Hei. 5(1993)-61432 have been disclosed. In these systems, a driving pulley driven by a motor and a driven pulley (provided at both fore side and rear side of a step panel) are provided under the step panel of a vehicle. In addition, a loop-like wire (or cable) is wound on each pulley, and a part of a slide door is fixed to a one end of the wire. Then, the slide door can move to open or close.

These wire or a cable driving system have design flexibility for the arrangement of an output rotation axis of a drive motor points in vertical or horizontal direction. However, an effective length of the wire is considerably changed, when a lower roller of the slide door is moving at either a straight line path or a curved line path of a rail. Then, a tension adjusting pulley is required to provide on the path of the wire. It makes the structure complex and makes the number of parts increase. In the structure of a cable driving system disclosed in Japanese Patent Laid-Open Publication published as No. Hei. 8(1996)-232539, durability of the cable may be worse, because sliding operation between the cable and a guiding tube may cause wearing.

These difficulties can not be eliminated even if the belt is simply alternated to a wire or a cable for the belt driving system described previously. More specifically, even if the belt is simply alternated to a wire, the conversion of the output rotation axis direction of the driving motor and the change of the effective length of the wire can not be eliminated all together.

SUMMARY OF THE INVENTION

In light of foregoing, according to an aspect of the present invention, a slide door opening and closing device for vehicles includes a wire winding pulley provided at a step panel positioned at under part of a vehicle and driven by a motor a driven pulley a lower roller supporting member, and a wire wound on said each pulley wherein the wire includes two wires, one end of each wire being fixed to wire winding pulley having a rotation axis in approximately horizontal direction, the other end of each wire is attached to the lower roller supporting member through a spring.

It is preferable that the lower roller supporting member includes a bracket fixed to the slide door and rotatably supporting a lower roller a housing fixed to the bracket and an engaging member accommodated in the housing and fixed to the other end of each wire wherein one end of the spring contacts with the engaging member and the other end of the spring contacts with an inner wall of the housing.

It is preferable that the housing is accommodated in a case fixed to the bracket.

It is preferable that the driven pulley includes at least a front pulley, a rear pulley and an idle pulley provided between the front pulley and the rear pulley, the lower roller supporting member moves along a path including a straight line path and a curved line path, and the wire is separated from the idle pulley when the lower roller supporting member passes the curved line path.

It is preferable that the wire is provided between the each pulley with straight line.

It is preferable that the idle pulley is provided at the vicinity of the curved line path.

It is preferable that the idle pulley contacts with two wires at the vehicle outer side.

BRIEF DESCRIPTION OF THE DRAWING FIGURES

The foregoing and additional features and property of the present invention will become more apparent from the following detailed description considered with reference to the accompanying drawing figures wherein.

DETAILED DESCRIPTION OF THE INVENTION

A preferred embodiment of the present invention will be described hereinbelow in detail with reference to the accompanying drawings.

A first embodiment of the present invention is explained referring to FIGS. 1 to 5.

Figure 1:
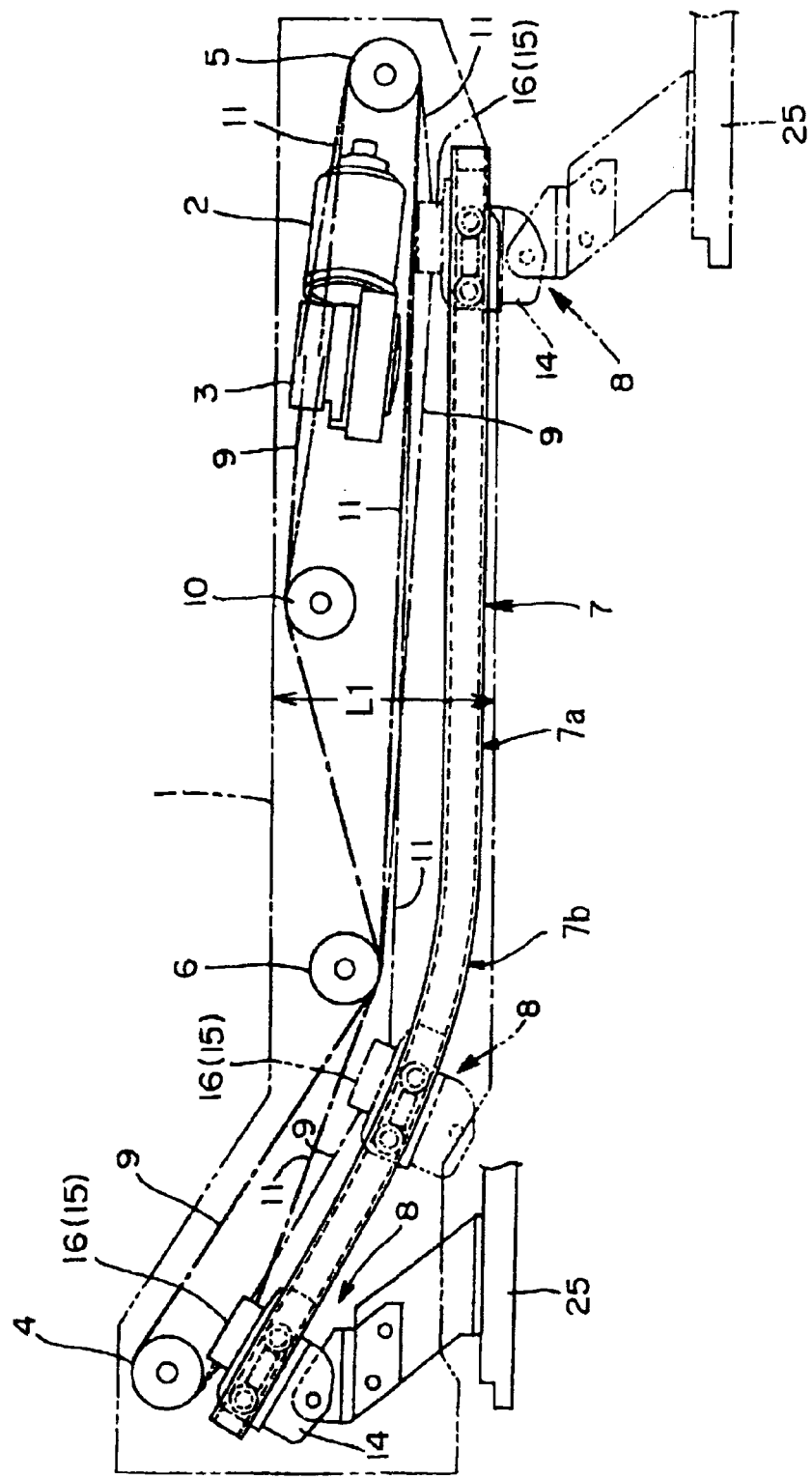
FIG. 1 is a plane view schematically illustrating a slide door opening and closing device according to a first embodiment of the present invention.

FIG. 1 is a plane view of a slide door opening and closing device for vehicles according to the present invention. As shown in FIG. 1, a wire winding pulley 3 driven by motor 2, driven pulleys including a front pulley 4 and a rear pulley 5, and an idle pulley 6 are provided in a step panel 1 placing under a part of a vehicle side opening. In addition, a lower roller supporting member 8 is provided under the step panel 1 with attaching a guide roller 12 and a load roller 13 on a lower rail 7 fixed to the vehicle body.

A first wire 9, wherein one end is attached to the wire winding pulley 3 and the other end is attached to the lower roller supporting member 8, is wound on a guide pulley 10, the idle pulley 6 and the front pulley 4. A second wire 11, wherein one end is attached to lower roller supporting member 8 and the other end is attached to wire winding pulley 3, is wound on the idle pulley 6 and the rear pulley 5. The idle pulley 6 contacts with both two wires 9, 11 at the outer side of the vehicle compartment, and provides requisite tension to both wires 9, 11.

Figure 2:
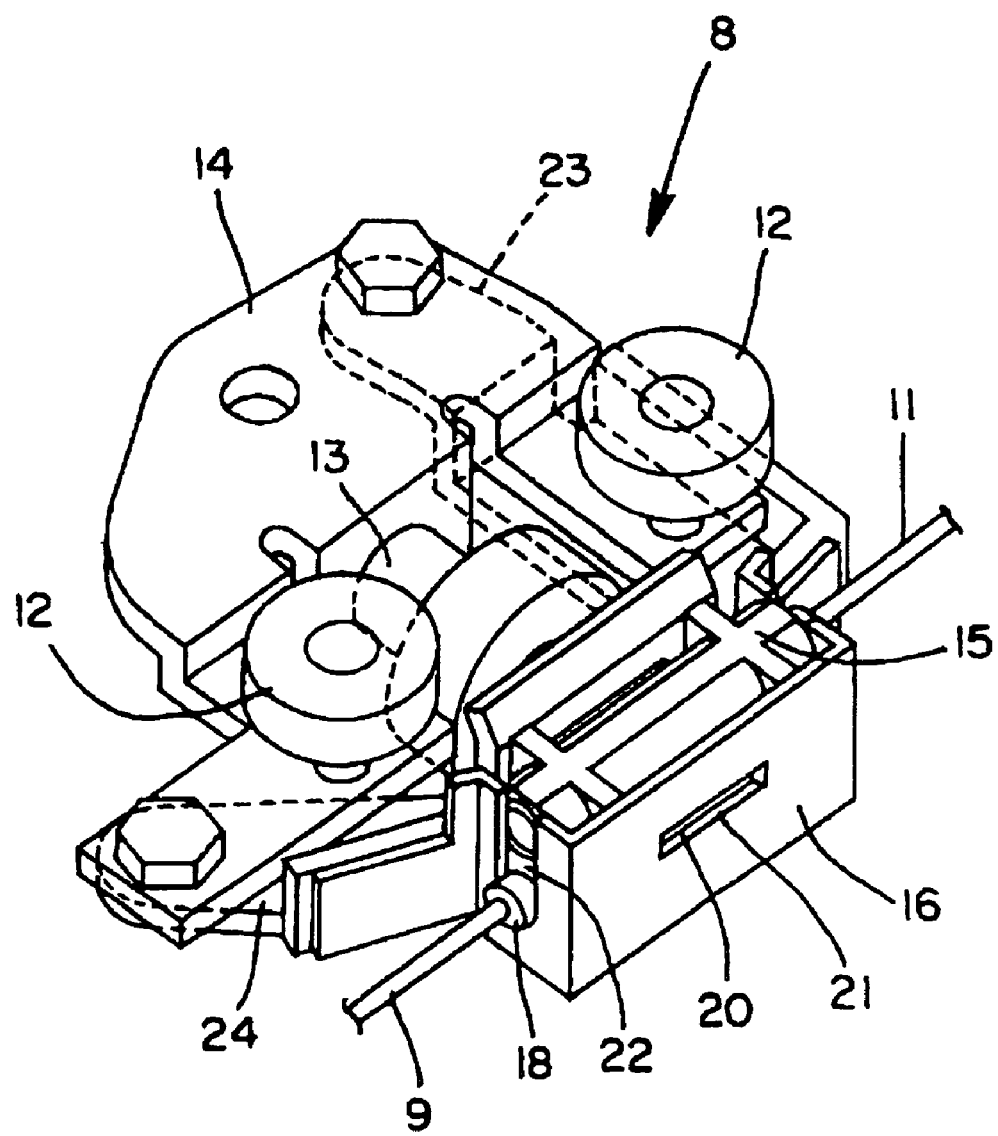
FIG. 2 is a perspective view schematically illustrating a lower roller supporting member.
Figure 3:
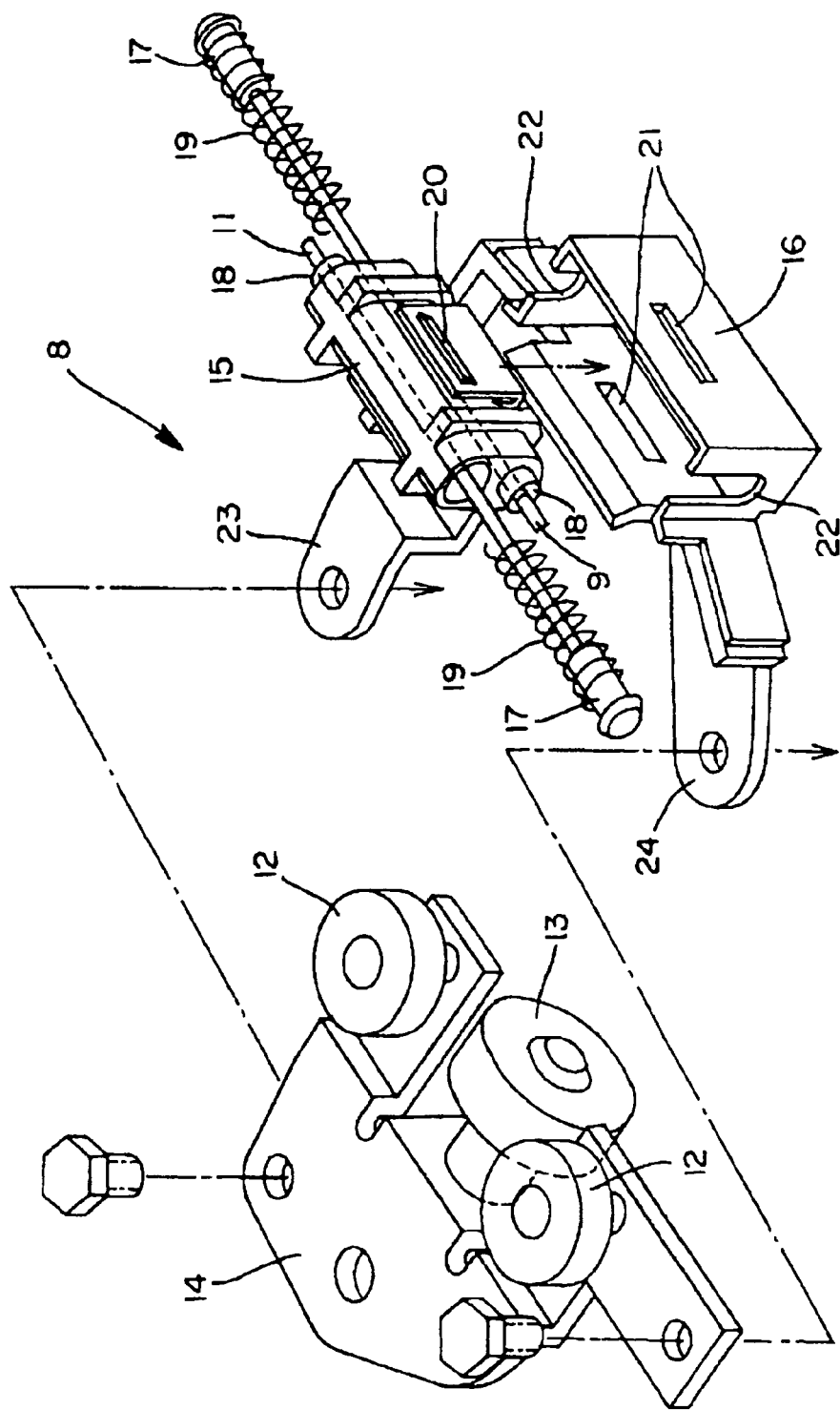
FIG. 3 is an exploded perspective view schematically illustrating a lower roller supporting member.

According to FIG. 2 and FIG. 3, the lower roller supporting member 8 includes guide rollers 12, 12, a bracket 14 rotatably supporting a load roller 13, a housing 15 holding two wires 9, 11, and a case 16 accommodating the housing 15. Guide rollers 12, 12 rotate and move along the lower rail 7 as a guide, and the load roller 13 rotates and moves on the lower plate (not shown) attached on the vehicle body.

The housing 15 has a pair of through-hole. In the each through-hole, each engaging member 17, 17 engaging each wire 9, 11 are inserted, respectively. At openings of the through-holes for putting through the each wire 9,11, guide portions 18, 18 are formed integrally with the housing 15 to guide the wires 9, 11. Coil springs 19, 19 are provided between each guide portion 18, 18 and each engaging member 17, 17, and bias the engaging member 17, 17 toward the opposite direction to the guide portion 18, 18.

The housing 15 is accommodated in a box-type case 16, and is fixed to the housing 15 by inserting projection portions 20 of the housing 15 into apertures 21, 21 of the case 16. The case 16 has cutting portions 22, 22 at opposed side face. When the housing 15 is accommodated in the case 16, the cutting portions 22, 22 of the case 16 prevent to pull out of the engaging members 17, 17 from the housing 15, and the wires 9, 11 are stretched through the cutting portions 22, 22.

Attachment portions 23, 24 are integrally formed with the case 16, and are fixed to the bracket 14 (for example, bolts are used to fix).

Since the bracket 14 and the case 16 are individually formed, the housing 15 attaching the wires 9, 11 can be fixed to the bracket which has been fixed to a slide door 25 in a previous assembling process.

Figure 4:
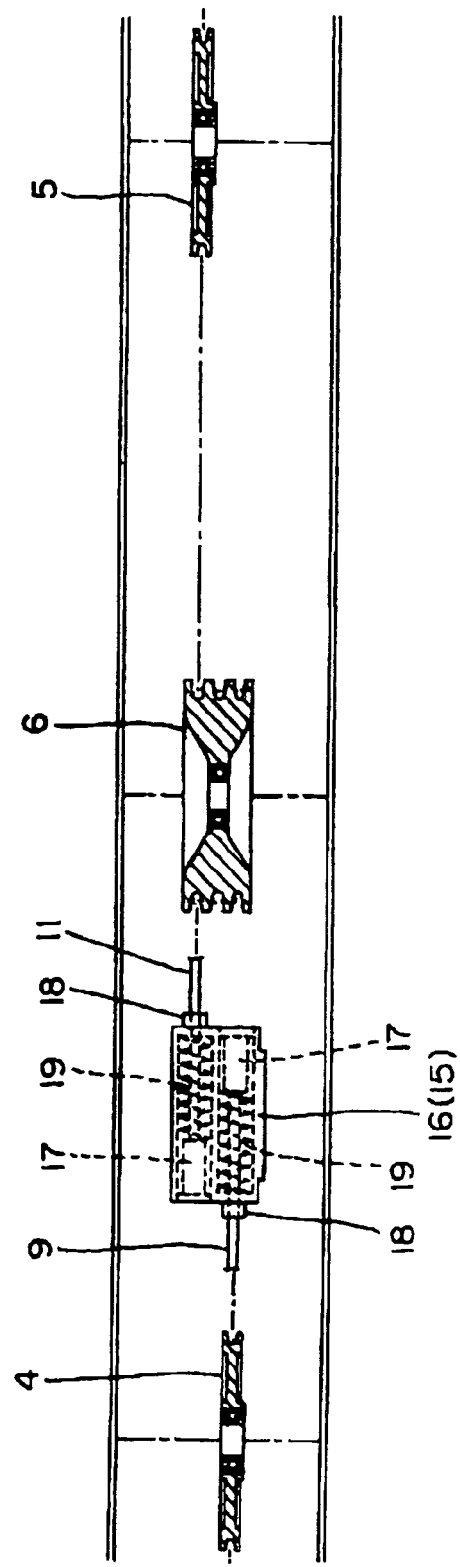
FIG. 4 is a plane view schematically illustrating a relationship between an idle pulley and a lower roller supporting member at a slide door closing condition.

In FIG. 1 and FIG. 4, when the bracket 14 is placed at left side, the slide door 25 is in closing condition. In this condition, the wire 9 is wound to the wire winding pulley 3, and the remains is wound on the guide roller 10, the idle pulley 6 and the front pulley 4, and receives a tension from the spring 19.

When the motor 2 is activated to make the slide door 25 move to opening direction, the wire winding pulley 3 winds the wire 11, and the wire 9 is rewound since the wire 9 is connected to the wire 11 via the housing 15 of the lower roller supporting member 8. Then, the wire 11 makes the bracket 14 move into right direction in FIG. 1, namely, the slide door 25 is moved to opening direction.

The lower rail 7 includes a straight line path 7a and a curved line path 7b. When the bracket 14 moves from the closing position to the opening position, the bracket 14 passes through the curved line path 7b of the lower rail 7 before the straight line path 7a.

The idle pulley 6 is located at the position that the wire 11 departs from the idle pulley 6 and becomes straight to the rear pulley 5 without slackening, when the bracket 14 passes through the curved line path 7b. And the springs 19, 19 provide tension to the wires 9, 11.

Figure 5:
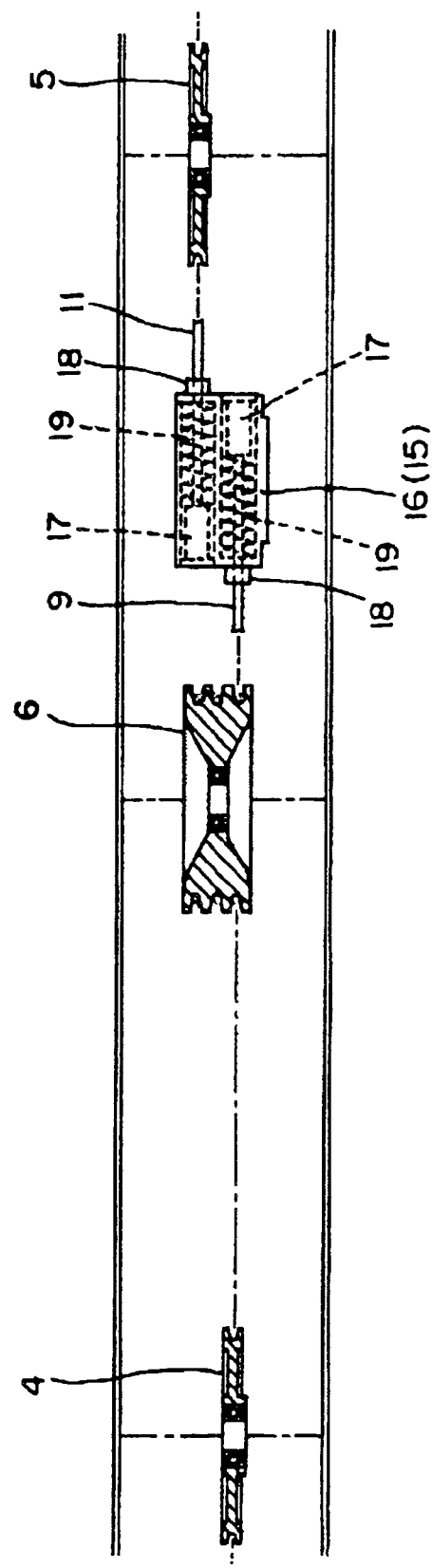
FIG. 5 is a plane view schematically illustrating a relationship between an idle pulley and a lower roller supporting member at a slide door opening condition.

Furthermore, by winding the wire 11 and rewinding the wire 9 to/from the wire winding pulley 3, as shown in FIG. 5, the bracket 14 comes to the straight line path 7a of the lower rail 7. Finally, the slide door 25 becomes fully opened condition. In this condition, the wire 9 contacts with the idle pulley 6, and the tension of the each wire 9, 11 are maintained at approximately constant.

Figure 6:
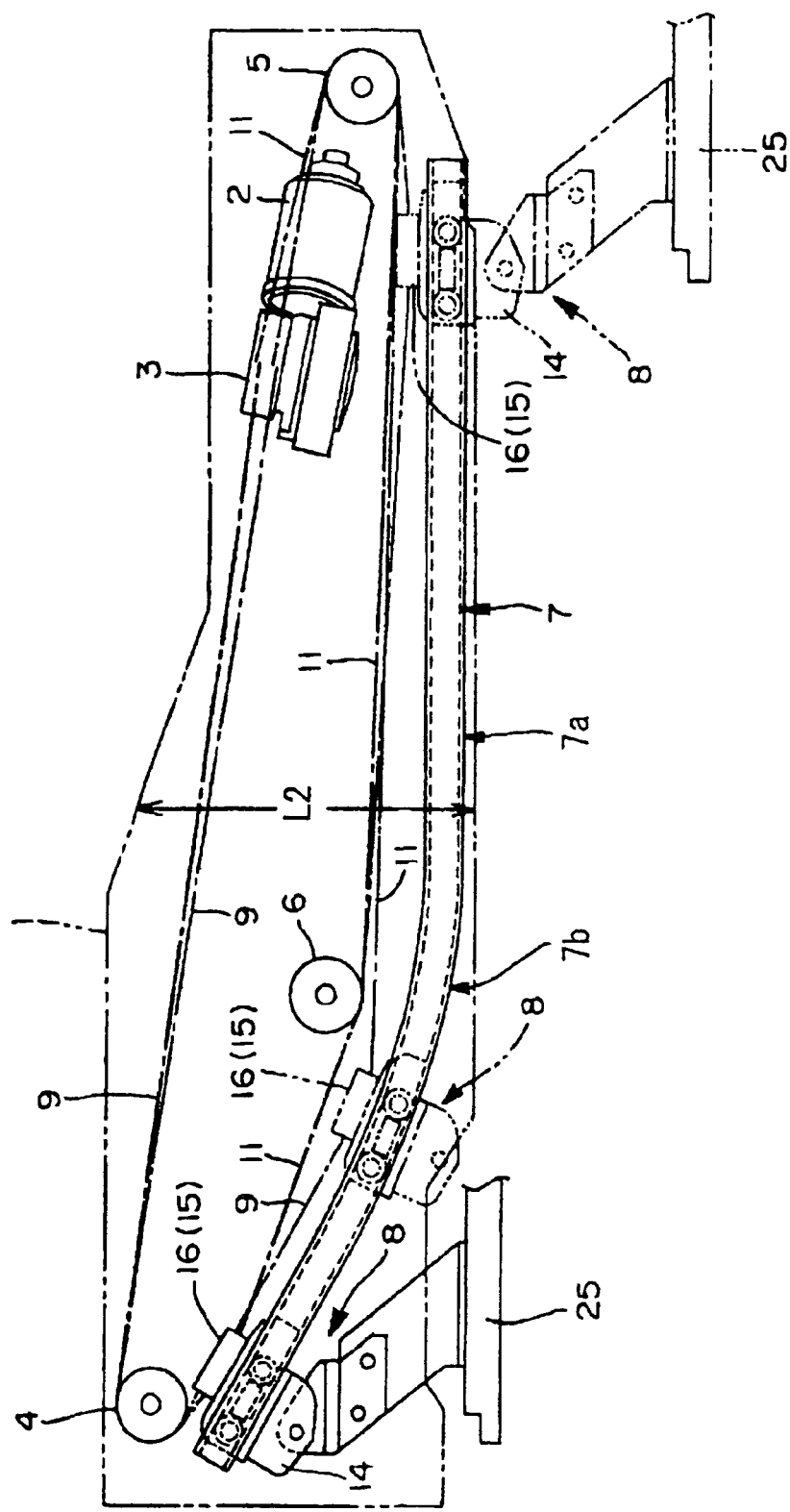
FIG. 6 is a plane view schematically illustrating a slide door opening and closing device according to a second embodiment of the present invention.
Figure 7:
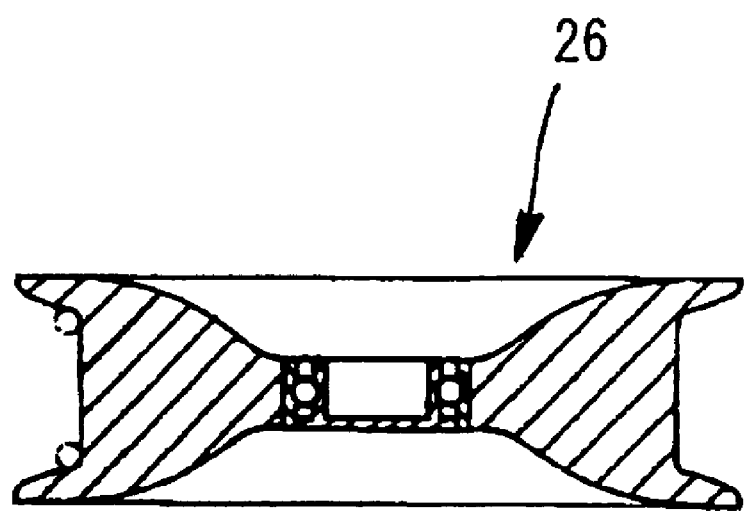
FIG. 7 is a plane view schematically illustrating another example of a wire winding pulley.

FIG. 6 shows a second embodiment of the present invention. In this embodiment, the wire 9 is directly wound on the front pulley 4 from the wire winding pulley 3 without hanging to the guide pulley 10 (explained in the first embodiment) between the wire winding pulley 3 and the front pulley 4. In this structure, a width of the step panel (L2) becomes broad corresponds to the first embodiment in FIG. 1 (L1). However, number of parts has been reduced.

As shown in FIG. 4 and FIG. 5, the idle pulley 6 has channels on its peripheral surface in the first embodiment. On the other hand, another pulley can be used. For example, as shown in FIG. 5, another example of the pulley 26 has large convex portion on its peripheral surface as opposed to channels.

According to embodiments of the present invention, projected area on a horizontal plane of the drive motor becomes small since a rotation axis of the wire winding pulley has pointed to horizontal direction. Accordingly, the inflated space area on the step panel 1 can be reduced for the setting of the driving device, and the step area of the step panel 1 becomes wider. User can easily gets on and off using the wide step panel 1.

The wire is constantly maintained as straight line by departing the wire from the idle pulley, when the lower roller passes the curved line path. And the wire contacts with the idle pulley provided close to the curved line path of the lower rail, when the lower roller is moving through the straight line path. Then, considerable change of the effective length of the wire is absorbed even if the lower roller is moving through the straight line path and the curved line path.

According to embodiments of the present invention, an assembling method of the component is that two springs putting through wires are stored in one housing made of resin, and the housing is engaged with a bracket attached to a lower roller supporting member. In this method, the structure becomes simple, and the device can be easily assembled.

In this device according to the present invention, wires are linearly hung between pulleys, and no outer casing has been used. Thus, a sliding friction to wires is dramatically reduced. As a result, a force for opening and closing operation is reduced, and durability of the wire is improved.

The principles, a preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A slide door opening and closing device for a vehicle, comprising:
   a step panel positioned at an under part of a side opening of the vehicle;
   a wire winding pulley provided in the step panel;
   the wire winding pulley being driven by a motor;
   a driven pulley;
   a lower roller supporting member; and
   a wire wound to the wire winding pulley and the driven pulley;
   wherein the wire comprises two wires, one end of each wire being fixed to the wire winding pulley having a rotation axis pointing in an approximately horizontal direction, the other end of each wire is attached to the lower roller supporting member through a spring;
   the end of each wire is engaged in a respective through-hole of a housing;
   the end of one wire and the end of the other wire extending in opposite directions in an approximately horizontal direction.

2. A slide door opening and closing device for a vehicle according to claim 1, wherein the lower roller supporting member includes:
   a bracket fixed to the slide door and rotatably supporting a lower roller;
   the housing being fixed to the bracket; and
   an engaging member accommodated in the housing and fixed to the other end of each wire;
   wherein one end of the spring contacts with the engaging member and the other end of the spring contacts with an inner wall of the housing.

3. A slide door opening and closing device for a vehicle according to claim 2, wherein the housing is accommodated in a case fixed to the bracket.

4. A slide door opening and closing device for a vehicle according to claim 2, wherein the driven pulley includes at least a front pulley, a rear pulley and an idle pulley provided between the front pulley and the rear pulley, the lower roller supporting member moves along a path including a straight line path and a curved line path, and the wire is separated from the idle pulley when the lower roller supporting member passes the curved line path.

5. A slide door opening and closing device for a vehicle according to claim 4, wherein the wire extends in a straight line between the driven pulley and the wire winding pulley.

6. A slide door opening and closing device for a vehicle according to claim 4, wherein the idle pulley is provided at the vicinity of the curved line path.

7. A slide door opening and closing device for a vehicle according to claim 6, wherein the idle pulley contacts the two wires at a vehicle outer side.

8. A slide door opening and closing device for a vehicle according to claim 1, wherein the driven pulley includes at least a front pulley, a rear pulley and an idle pulley provided between the front pulley and the rear pulley, the lower roller supporting member moves along a path including a straight line path and a curved line path, and the wire is separated from the idle pulley when the lower roller supporting member passes the curved line path.

9. A slide door opening and closing device for a vehicle according to claim 8, wherein the wire extends in a straight line between the driven pulley and the wire winding pulley.

10. A slide door opening and closing device for a vehicle according to claim 8, wherein the idle pulley is provided at the vicinity of the curved line path.

11. A slide door opening and closing device for a vehicle according to claim 10, wherein the idle pulley contacts the two wires at a vehicle outer side.

12. A slide door opening and closing device for a vehicle according to claim 1, wherein the wire extends in a straight line between the driven pulley and the wire winding pulley.

13. A slide door opening and closing device for a vehicle, comprising:
    a step panel positioned at an under part of a side opening of the vehicle;
    a wire winding pulley provided in the step panel, the wire winding pulley being oriented so that a rotation axis of the wire winding pulley extends in an approximately horizontal direction;
    a motor operatively connected to the wire winding pulley to drive the wire winding pulley;
    a driven pulley;
    a lower roller supporting member;
    a first wire comprising one end fixed to the wire winding pulley and an opposite end fixed to the lower roller supporting member through a first spring, the first wire being wound on the driven pulley; and
    a second wire comprising one end fixed to the wire winding pulley and an opposite end fixed to the lower roller supporting member through a second spring, the second wire being wound on the driven pulley.

14. A slide door opening and closing device for a vehicle according to claim 13, wherein the lower roller supporting member comprises a housing, the opposite end of the first wire and the opposite end of the second wire being connected to the housing.

15. A slide door opening and closing device for a vehicle according to claim 14, wherein the opposite end of the first wire extends through a through hole in the housing, and the opposite end of the first wire extends through another through hole in the housing.

16. A slide door opening and closing device for a vehicle according to claim 14, including a first engaging member engaging the opposite end of the first wire, and a second engaging member engaging the opposite end of the second wire, the first spring being disposed between the first engaging member and the housing, and the second spring being disposed between the second engaging member and the housing.

17. A slide door opening and closing device for a vehicle according to claim 13, wherein the lower roller supporting member comprises a plurality of guide rollers which are movable along a guide rail.

18. A slide door opening and closing device for a vehicle according to claim 13, wherein the lower roller supporting member comprises a bracket fixed to the slide door.

19. A slide door opening and closing device for a vehicle according to claim 13, wherein the first and second wires extend away from the lower roller supporting member in opposite directions.

* * * * *